United States Patent [19]

Harrison et al.

[11] Patent Number: 5,886,661
[45] Date of Patent: Mar. 23, 1999

[54] SUBMERGED OBJECT DETECTION AND CLASSIFICATION SYSTEM

[75] Inventors: Richard W. Harrison, Bethesda; John F. Scarzello, Columbia, both of Md.

[73] Assignee: The United States of America as represented by the Secretary of the Navy, Washington, D.C.

[21] Appl. No.: 48,101

[22] Filed: Apr. 16, 1993

[51] Int. Cl.⁶ .......................... G01S 13/04; G01S 13/88
[52] U.S. Cl. .......................... 342/22; 342/27; 342/28; 342/90
[58] Field of Search .................. 342/22, 27, 28, 342/192, 90

[56] References Cited

U.S. PATENT DOCUMENTS

| | | | |
|---|---|---|---|
| 3,329,929 | 7/1967 | Burnett | 340/4 |
| 3,425,032 | 1/1969 | Borbin | 340/4 |
| 3,707,913 | 1/1973 | Lee | 102/18 |
| 3,719,947 | 3/1973 | Gutton et al. | 343/112 R |
| 3,903,520 | 9/1975 | Shostak | 343/5 PD |
| 3,946,696 | 3/1976 | Lubnow | 114/221 R |
| 4,072,941 | 2/1978 | Hamid et al. | 343/5 NA |
| 4,195,359 | 3/1980 | Miller et al. | 367/94 |
| 4,203,108 | 5/1980 | Eknayan | 340/850 |
| 4,206,510 | 6/1980 | Strait | 367/94 |
| 4,403,314 | 9/1983 | Tournois | 367/100 |
| 4,558,439 | 12/1985 | Güdesen | 367/127 |
| 4,562,789 | 1/1986 | Bornhofft et al. | 114/312 |
| 4,582,582 | 4/1986 | Gibbard | 204/193 |
| 4,627,891 | 12/1986 | Gibbard | 204/1 R |
| 4,721,961 | 1/1988 | Busignies et al. | 342/458 |
| 4,938,136 | 7/1990 | Gould | 102/406 |
| 4,970,701 | 11/1990 | Kirkland | 367/131 |
| 4,970,702 | 11/1990 | Kirkland | 367/131 |
| 4,972,385 | 11/1990 | Teel | 367/99 |
| 4,992,786 | 2/1991 | Kirkland | 340/850 |
| 5,001,485 | 3/1991 | Jones | 342/13 |
| 5,007,346 | 4/1991 | Kirkland | 102/402 |
| 5,019,822 | 5/1991 | Kirkland | 342/22 |
| 5,063,850 | 11/1991 | Olsson et al. | 102/402 |
| 5,091,890 | 2/1992 | Dwyer | 367/99 |
| 5,153,595 | 10/1992 | Harmuth | 342/22 |
| 5,159,343 | 10/1992 | Harmuth | 342/22 |
| 5,228,006 | 7/1993 | Sheriff | 367/103 |
| 5,231,401 | 7/1993 | Kaman et al. | 342/55 |

*Primary Examiner*—John B. Sotomayor
*Attorney, Agent, or Firm*—John Forrest; Jacob Shuster

[57] ABSTRACT

A detection and classification system for underwater objects uses a transmitting unit and a receiving unit. The transmitting unit comprises a waveform generator, a power amplifier, and a transmitting antenna. The receiving unit comprises a receiving antenna, a pre-amplifier, a first harmonic suppressor, a digitizer, and a computer. The transmitting unit radiates an analog electromagnetic wave signal into a conductive medium such as seawater which the receiving unit detects and analyzes by a differential spectral analysis after conversion of the signal into binary code.

The system uses a signal-processing method which includes the steps of determining the size of the underwater object to be detected, transmitting an electromagnetic wave with a wavelength proportioned to the size of the object, performing a spectral analysis of the received signal, performing a spectral analysis at a different time or different location, comparing the two spectra performed, and analyzing the difference between the two spectra.

5 Claims, 4 Drawing Sheets

SUBMERGED OBJECT DETECTION AND CLASSIFICATION SYSTEM

ORIGIN OF THE INVENTION

The invention described herein was made in the performance of official duties by an employee of the Department of the Navy and may be manufactured, used, licensed by or for the Government for any governmental purpose without payment of any royalties thereon.

1. Field of the Invention

The present invention relates generally to detection of underwater objects and more particularly to detection and classification of underwater objects using electromagnetic waves.

2. Background of the Invention

Methods for detecting mines and other submerged objects can generally be categorized into either passive or active systems. Passive systems operate by sensing a disturbance in the underwater environment created by the presence of a submerged object. One example of a passive system is an underwater acoustical device wherein a single hydrophone or a hydrophone array senses acoustic energy emanating from such noise sources as the propulsion motors of a submarine or the forming and collapsing of bubbles around a moving underwater object. Such acoustical systems typically have the problem of sensing background noise generated by waves at the surface of the body of water. Another example of a passive system is an airborne magnetometer which detects finite disturbances or distortions in the earth's magnetic field. This type of system works only for magnetic or metallic objects of considerable size.

Active systems, on the other hand, rely on independent radiating sources to probe an area to be searched and illuminate the submerged object. One example of this type of system is a conventional sonar device wherein a highly directional beam of sonic energy periodically radiates from a scanning transducer which in turn operates as a receiver to detect echoes reflected from any object within the path of propagation. Sonar devices, however have relatively high transmission losses which increase as a function of the frequency of the propagated energy. As a result, these devices demand a compromise between achieving a maximum range of detection, which requires relatively low frequency signals, and achieving optimum target classification, which requires relatively high frequency signals. Sonar devices also have the shortcoming of sensing background noise generated by surface waves.

Another example of an active system is disclosed in U.S. Pat. No. 5,019,822 by Kirkland. Kirkland discloses a system having a transmitter which sends radio waves through the atmosphere to two antenna units. The first antenna unit receives the radio signal, amplifies it, and then transmits the electromagnetic energy in the radio frequency through a conductive medium such as water. The second antenna unit receives this electromagnetic energy and amplifies it. The second antenna unit also receives the radio signal sent by the transmitter through the atmosphere and amplifies this signal. The second antenna unit then utilizes a phase comparator to analyze the two signals received. The phase comparator sends its output to a monitor which detects and locates the occurrence or presence of anomalies to the electromagnetic transmission within the conductive medium. This system focuses mainly on indicating the presence of a foreign object such as a swimmer rather than detection and classification of all underwater objects.

SUMMARY OF THE INVENTION

Accordingly, an object of the present invention is to detect and determine the location of an underwater object.

Another object is to detect and classify underwater objects with a device less susceptible to ocean and surf noise.

Yet another object is to detect and classify both metallic and non-metallic underwater objects.

A further object is to detect and classify an underwater object with a device having a wide range of detection capabilities.

The present invention attains the foregoing and additional objects by providing an underwater object detection and classification system which comprises a transmitting unit and a receiving unit. The transmitting unit comprises a waveform generator, a power amplifier, and a transmitting antenna. The receiving unit comprises a receiving antenna, a pre-amplifier, a first harmonic suppressor, a digitizer, and a computer.

In accordance with one aspect of the invention, the waveform generator, such as a waveform synthesizer, generates a highly stable, electrical sine wave signal at a predetermined frequency. This frequency is preferably the root of a Fourier transform of a previously received signal. The power amplifier receives the generated signal, amplifies it and then sends it to the transmitting antenna. The transmitting antenna, placed in a conductive medium such as seawater, radiates an electromagnetic wave signal through the medium. The receiving antenna, also located in the medium, detects the radiated electromagnetic signal and produces a voltage related to the radiated signal. The preamplifier increases the strength of the electrical voltage signal before routing it to the first harmonic suppressor. The first harmonic suppressor significantly reduces the fundamental frequency of the received signal, prevents overloading of the digitizer, and enables close examination of the upper sidebands of the received signal. The digitizer converts the received analog signal into a binary digital code. The computer receives this digital code and analyzes the output of the system. This analysis preferably includes using a Fourier transform to separate the frequency components of the signal.

When the transmitted electromagnetic signal encounters an underwater object in the conductive medium, its structure will alter and manifest itself by a shift in energy from the fundamental frequency to the harmonics. Consequently, continual examination of the frequency components, as either the two antennas move or as an underwater object appears in the conductive medium, permits determination of the location and identification of the object.

The computer uses a signal-processing technique to extract the signal of the underwater object from the signal received at the receiving antenna. One example of such a signal-processing technique would include the step of exciting the transmitting antenna with a square wave of a particular frequency such that the transmitted wave would have a wavelength proportioned to the size of the targeted object. This technique would also involve the computer performing a spectral analysis of the received signal and comparing it with a spectral analysis performed at a different time or different location with identical equipment. The computer analyzes the differences in the two spectra to indicate the presence of an object and to classify the object detected.

Still other objects and advantages of the present invention will become readily apparent to those skilled in the art from the following drawings and detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The foregoing objects and other advantages of the present invention will be more fully understood from the following detailed description and reference to the appended drawings wherein.

DETAILED DESCRIPTION OF THE INVENTION

Figure 1:
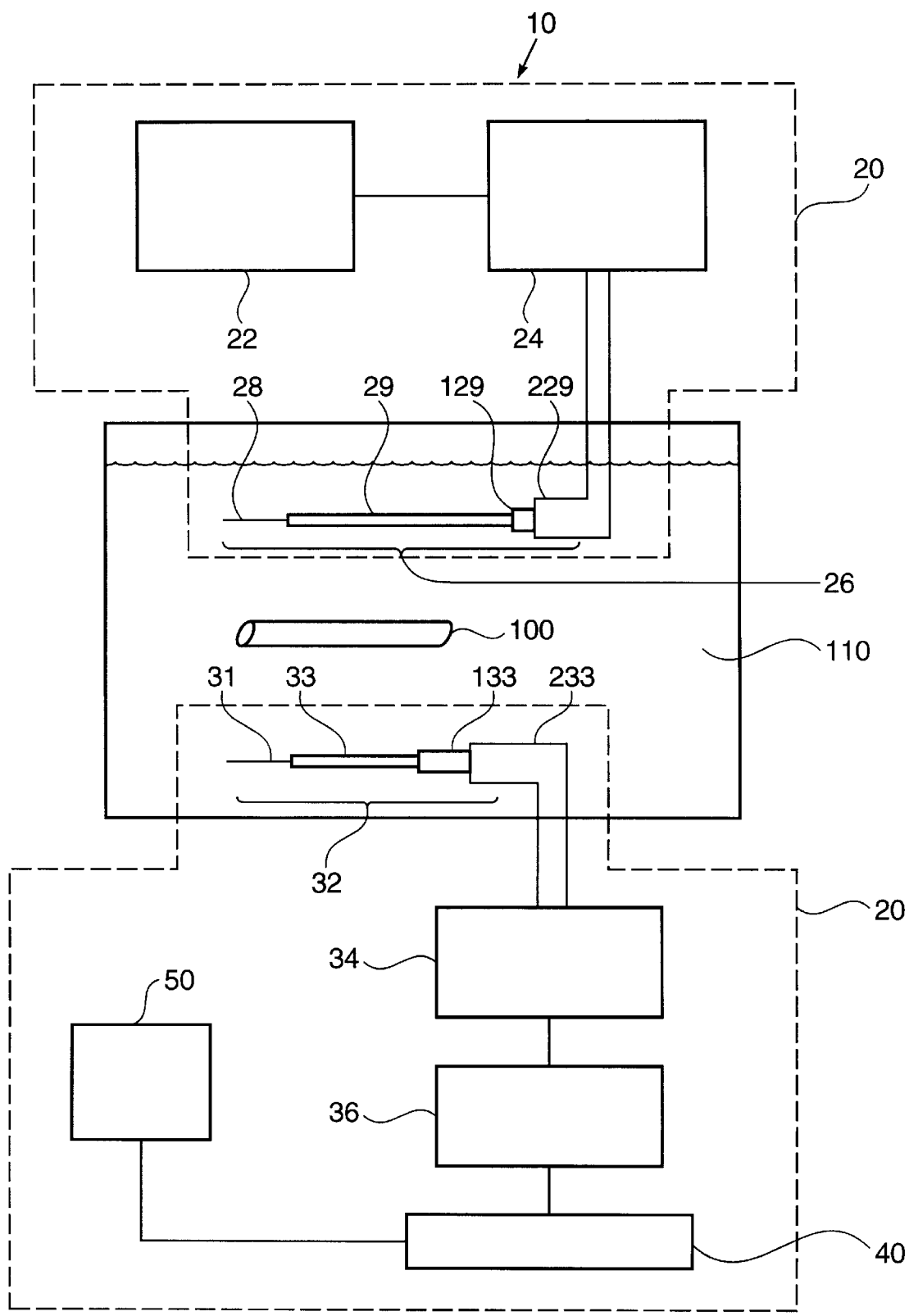
FIG. 1 illustrates a submerged object detection and classification system of the present invention.

FIG. 1 illustrates a system 10 for detecting and classifying an object 100 submerged in an electrically conductive liquid 110. The system 10 comprises a transmitting unit 20 and a receiving unit 30. The transmitting unit 20 comprises a waveform synthesizer 22, a power amplifier 24, and a transmitting antenna 26. The receiving unit 30 comprises a receiving antenna 32, a pre-amplifier 34, a first harmonic suppressor 36, a digitizer 40 and a computer 50.

In accordance with one aspect of the invention, the waveform synthesizer 22 generates a highly stable electrical sine wave signal at a predetermined frequency. Preferably, this frequency is the root of a Fourier transform of the algorithm describing a previously received signal. The waveform synthesizer has controls for adjusting the frequency, i.e., wavelength of the signal to an ideal value. The power amplifier 24 amplifies the electrical signal and then sends it to the transmitting antenna 26, which is located in the electrically conductive liquid 110. The transmitting antenna 26 comprises a copper wire 28 surrounded by an insulating sleeve 29. A copper-braided sleeve 129 surrounds the insulating sleeve 29, and a second insulator 229 surrounds the copper-braided sleeve 129. The transmitting antenna 26 transduces the electrical signal and then radiates or emits and propagates an electromagnetic signal through the electrically conductive liquid 110.

The receiving antenna 32, which is also positioned in the electrically conductive liquid 110, detects the radiated electromagnetic signal. The receiving antenna 32 has similar construction as the transmitting antenna 26. The antenna 32 comprises a copper wire 31, an insulating sleeve 33 which surrounds the wire 31, a copper-braided sleeve 133 which surrounds the sleeve 33, and a second insulator 233 which surrounds the copper-braided sleeve. The receiving antenna 32 transduces the detected electromagnetic signal into a voltage related to the transmitted signal and sends this electrical voltage signal to the preamplifier 34. The preamplifier 34 increases the strength of the received electrical signal before sending it to the first harmonic suppressor 36.

The first harmonic suppressor 36 receives the amplified signal. This amplified signal has a fundamental frequency node with an amplitude which exceeds the limits for performing a spectral analysis by means of computer 50. In particular, the amplitude of the fundamental frequency signals node creates an overload on the digitizer 40. Accordingly, the first harmonic suppressor 36 significantly reduces the amplitude of the fundamental frequency and thereby prevents overloading of the digitizer 40. The first harmonic suppressor also enables close examination of the upper sidebands of the received signal.

The digitizer 40 receives the suppressed signal and converts this analog signal into a binary digital code. The computer 50 receives the digital code and analyzes it. This analysis involves a signal-processing technique which uses a Fourier transform to separate the frequency components of the received signal.

When the transmitted electromagnetic signal encounters the submerged object in the conductive liquid, its structure will alter and manifest itself in the received signal by a shift in energy from the fundamental frequency to the harmonics. Any shift or alteration in the received signal may be detected by a continual examination of the frequency components of the received signal. Consequently, continual examination of these components, as either the two antennas move or as the submerged object appears in the conductive liquid, enables determination of the location and identification of the object. The signal processing technique of the system accordingly uses a differential spectral analysis to examine continually the frequency components.

Figure 2:
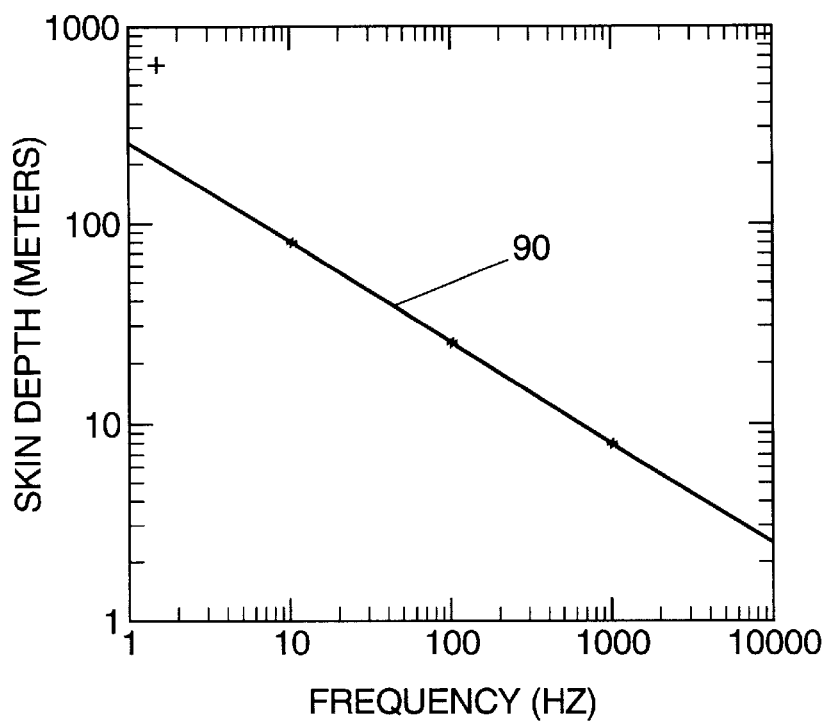
FIG. 2 is a graph indicating the relationship between frequency and skin depth in an aqueous media.

The system 10 also applies other physical design considerations to analyze the digital code. These design considerations deal primarily with the propagation of electromagnetic energy through an aqueous media such as salt water in oceans. FIG. 2 illustrates the electromagnetic relationship between frequency of the electromagnetic energy and the ability of such energy to penetrate through salt water. The ability of the media to transmit such electromagnetic energy, or conversely to attenuate such energy, is expressed in terms of skin depth $\delta$ where one skin depth is defined as that water depth which attenuates a signal to 1/e of its former value, or by about 8.7 dB.

The skin depth $\delta$ characteristic of a particular conductive liquid is dependent upon the conductivity of the liquid and the frequency of the energy being transmitted. Thus, skin depth $\delta$ may be expressed as the equation $\delta = 20 \sqrt{\rho f}$ inches where $\rho$ equals conductivity in mhos per meter and f equals frequency in megahertz. In FIG. 2, then, a plot of skin depth versus frequency for sea water having a salt content of about 35 parts per thousand, and a conductivity of 5 mhos per meter, is represented by line or curve 90.

The skin depth $\delta$ may also be represented as a function of wavelength. In particular, the wavelength $\lambda$ in a conductive liquid may be expressed as $\lambda = 2 \pi \delta$. Given these design parameters, the wavelength of the transmitted electromagnetic signal may be determined and proportioned to the size of the submerged object. Preferably, the transmitted electromagnetic signal has a wavelength which is ⅛ to 8 times the length of the submerged object.

In accordance with one aspect of the invention, the signal-processing technique would include the step of exciting the transmitting antenna with a square wave of a predetermined frequency. The frequency chosen typically is a root of a Fourier transform of the algorithm describing a previously received signal. Additionally, the transmitted square wave signal has a wavelength proportioned to the size of the submerged object. The computer performs a spectral analysis of the frequency components of the received signal and compares it with a spectral analysis of the frequency components at a different time or different location with the same transmitting unit 20 and receiving unit 30. The computer then analyzes the difference in the two spectra of frequency components.

Figure 3:
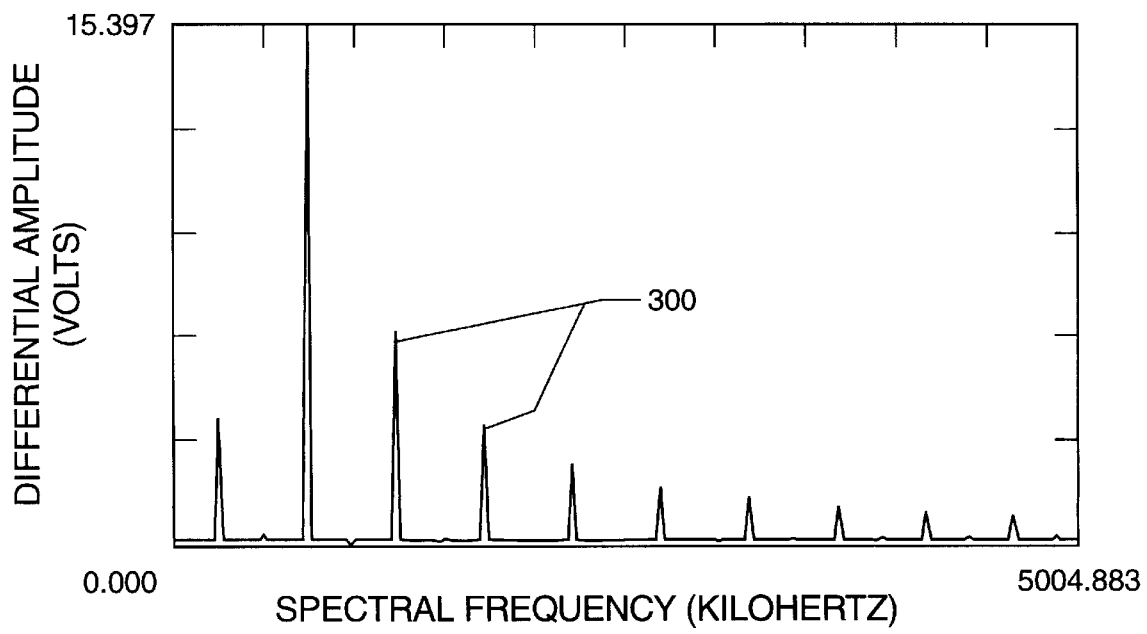
FIG. 3 is a spectral analysis of a signal received by the system without the presence of a submerged object.
Figure 4:
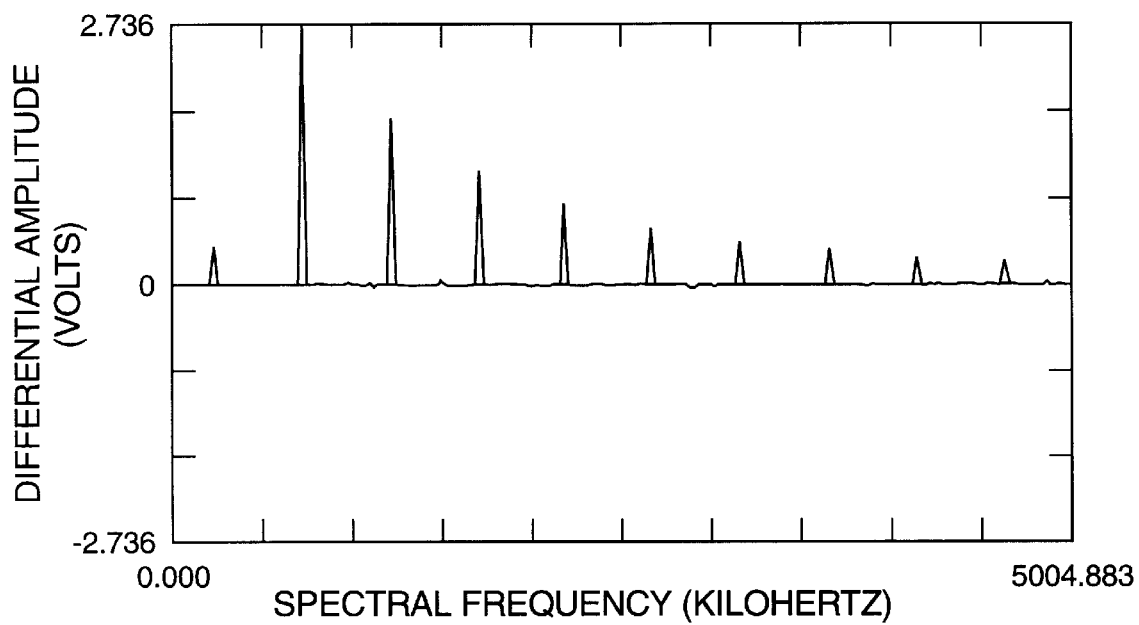
FIGS. 4–7 illustrate differential spectral analyses for various submerged objects.
Figure 5:
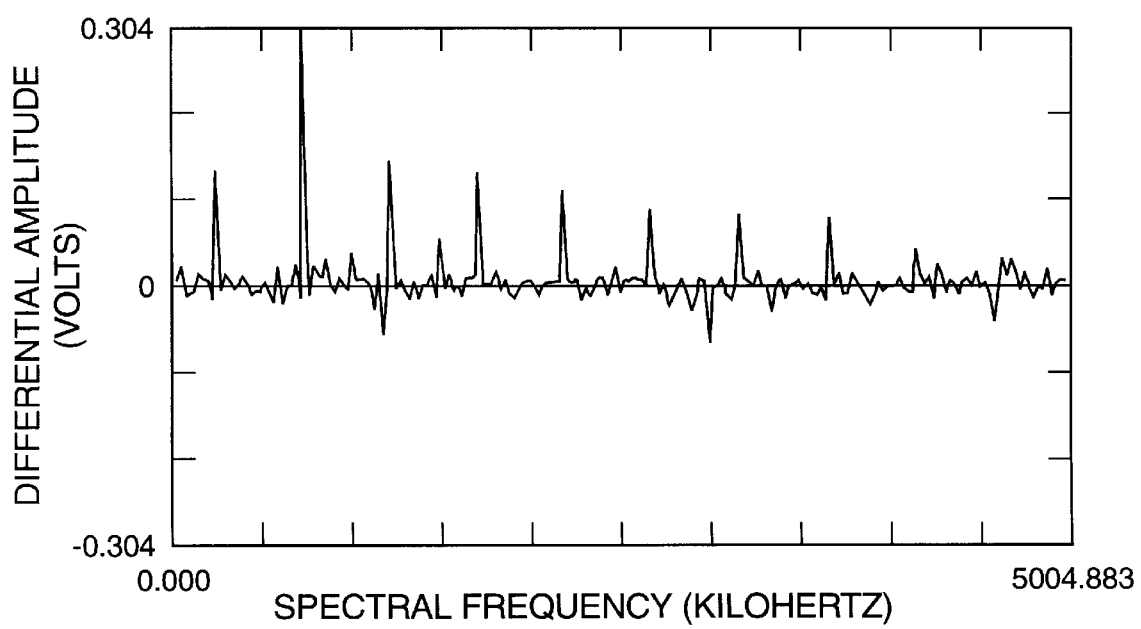
Figure 6:
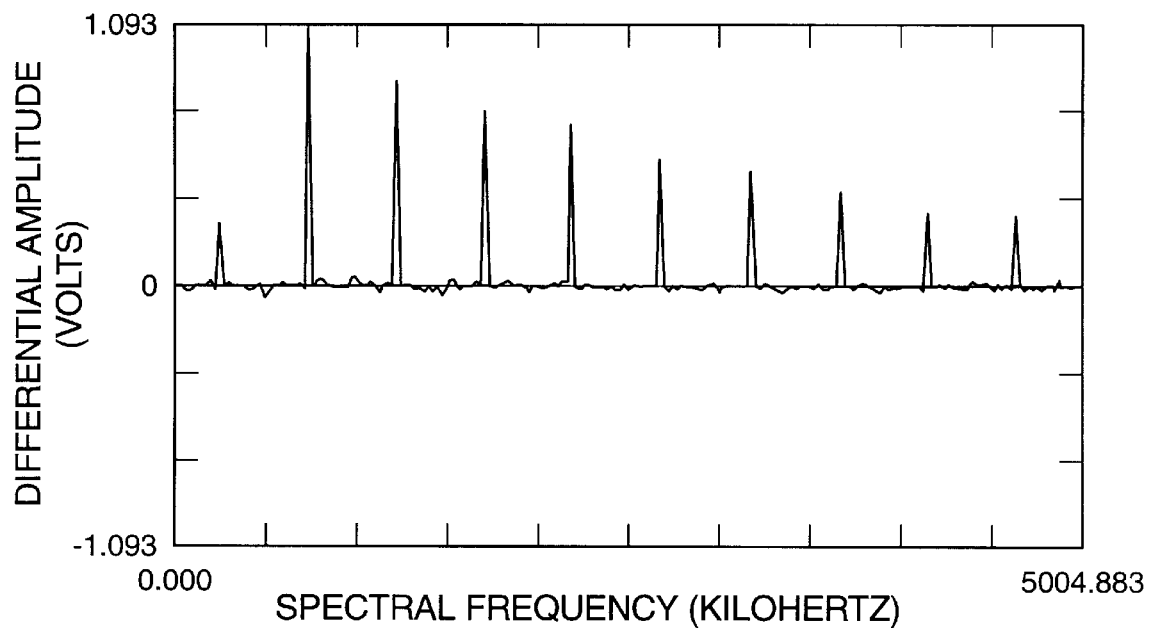
Figure 7:
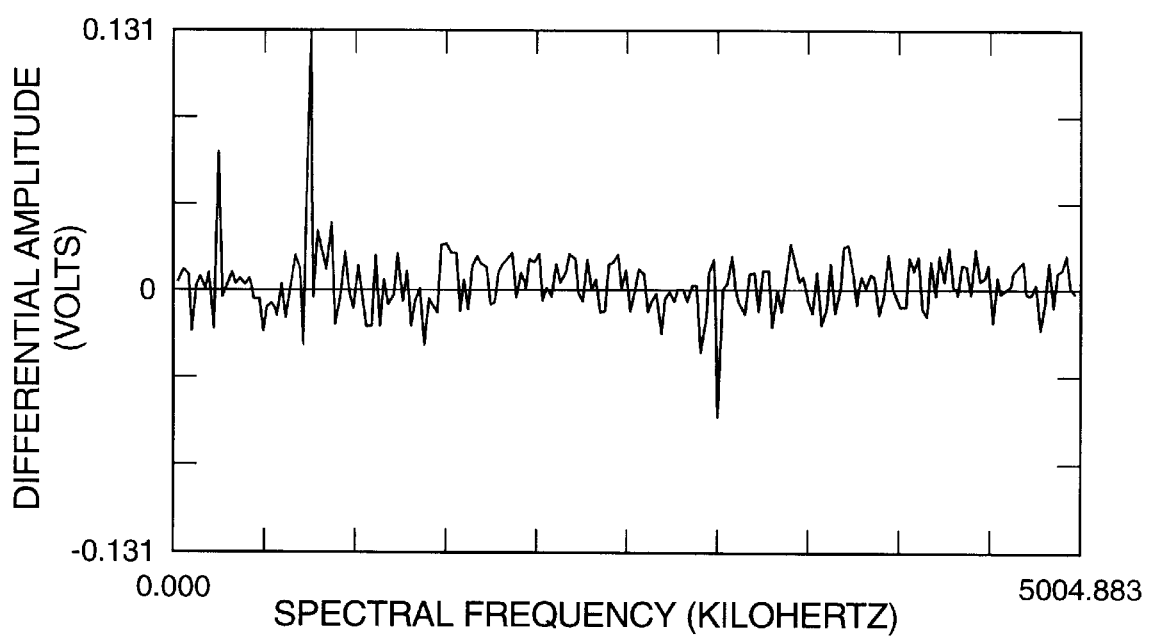

FIG. 3 indicates a spectral analysis of a received electromagnetic signal from the system during a calibration run without the presence of a submerged object. The analysis plots the amplitude of the received signal against the frequency of the received signal. The result is a series of amplitude spikes 300 at different frequencies. When the transmitted signal encounters the submerged object, the amplitude spikes will alter in amplitude. Accordingly, FIG. 4 illustrates a differential spectral analysis obtained by subtracting a spectral analysis of a sixteen inch long metal rod from the spectral analysis performed during the calibration run of FIG. 3. Likewise, FIG. 5 illustrates a differential spectral analysis for an aluminum can, FIG. 6 shows a differential analysis for a mine, and FIG. 7 indicates a differential analysis for a plastic object. Each differential analysis varies depending on the size and metallic nature of the submerged object. Accordingly, the signal processing technique of the present invention indicates the presence of the object and also classifies the object detected.

The novel features of this invention include the first harmonic suppressor which prevents overloading of the digitizer and enables close examination of the upper sidebands of the received signal. Other novel features include a signal processing technique which detects differences in the amplitude of the received signal and location of both the transmitting antenna and the receiving antenna in the conductive medium.

The advantages of the present invention include the ability to detect and classify a submerged object. Another advantage of the present invention is detecting and classifying submerged objects with a device less susceptible to ocean and surf noise. Yet another advantage is detection and classification of submerged objects with a device having a wide range of detection.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. Apparatus for sensing objects in a body of electrically conductive liquid comprising: a transmitter operative to emit electromagnetic radiation within said body of liquid; antenna means at a predetermined location within the body of liquid for receiving said electromagnetic radiation as transmitted signals respectively propagated through the body of liquid with and without interference by the objects to be detected; and signal processing means connected to the antenna means for comparing differences in analyses of only the transmitted signals propagated exclusively through said body of liquid and respectively received at different times by the antenna means to obtain therefrom classification data on the objects detected.

2. A system for detecting and classifying an object in a body of electrically conductive liquid, comprising:

transmitter means for emitting electromagnetic radiation from a region within the electrically conductive liquid at a predetermined wavelength proportional to size of the object to a predetermined location in the body of electrically conductive liquid; receiver means positioned at the predetermined location for transducing the electromagnetic radiation propagated through the liquid from said transmitter means into an electrical signal; signal processing means connected to said receiver means and positioned outside the body of electrically conductive liquid for converting the electrical signal into a digital code; and computer means connected to said signal processing means for extracting classifying data on the object from the digital code outside of the body of electrically conductive liquid.

3. A system for detecting and classifying an object in a body of electrically conductive liquid as recited in claim 1 wherein said processing means includes preamplifier means connected to said receiver means for amplifying the electrical signal.

4. A system for detecting and classifying an object in a body of electrically conductive liquid as recited in claim 3, wherein the signal processing means further includes means connected to said preamplifier means for suppressing fundamental frequency of the amplified electrical signal.

5. The apparatus as defined in claim 1 wherein said transmitter includes waveform synthesizer means for generating the electromagnetic radiation as square waves having wavelengths proportioned to size of the objects.

* * * * *